March 20, 1956    R. E. RISLEY ET AL    2,738,995
PIPE COUPLING WITH MULTIPART CLAMP
Filed Aug. 6, 1953    8 Sheets-Sheet 1

March 20, 1956  R. E. RISLEY ET AL  2,738,995
PIPE COUPLING WITH MULTIPART CLAMP
Filed Aug. 6, 1953  8 Sheets-Sheet 5

United States Patent Office 2,738,995
Patented Mar. 20, 1956

2,738,995

PIPE COUPLING WITH MULTIPART CLAMP

Roger E. Risley and Howard L. Hoke, Bradford, Pa., assignors to Dresser Industries, Inc., Dallas, Tex., a corporation of Pennsylvania Application August 6, 1953, Serial No. 372,790

7 Claims. (Cl. 285—196)

The present invention relates generally to pipe couplings and is more particularly concerned with couplings for large diameter pipe, e. g. pipe having a diameter of twenty-four inches or more. The term "coupling" is herein used in a generic sense to include couplings, clamps and similar pipe fittings. The invention is especially related to couplings suitable for interconnecting plain end pipe and comprising a middle ring, annular gaskets receivable in recesses at the ends of the middle ring, and follower rings for applying pressure to the gaskets, and will be described with reference to such couplings. However, it will be understood that the terms "middle ring," "follower," etc. are used for convenience and clarity of expression and are to be construed as including analogous structures.

In a pipe coupling of the kind employing an annular gasket and a follower ring for applying pressure to the gasket, the follower ring is subjected to considerable torque owing to the fact that the pull of the bolts or other tightening means and the resistance of the gasket are not in line with one another, the bolts being positioned a greater radial distance from the pipe than is the gasket. This torque tends to make the follower roll over when the bolts are tightened. In couplings for small diameter pipe, the curvature of the follower rings is such that rolling is not a serious problem since the curved sections of such follower rings are generally sufficiently resistant to rolling. However, as the diameter of the coupling increases, the curvature of the follower ring becomes less and less until the portions between successive bolts closely approach a straight line and the tendency to roll is greatly increased.

A further problem arising in large diameter couplings, for example couplings of more than 30" diameter, is that of obtaining gasket pressure which is uniform around the entire circumference of the pipe. Variations in clearance between the pipe and the middle ring result in variations in the radial depth of the gasket recess and hence variations in gasket pressure. In small diameter couplings, the gasket tends to redistribute itself around the circumference of the pipe by reason of flow of the gasket material and approximately equal pressure is realized. However, in large diameter couplings, the flow of gasket material is insufficient to compensate for variations in clearance between the middle ring and the pipe because of the greater circumferential distances involved. When the follower ring is drawn up, its movement is limited by the "high points," leaving intermediate points where gasket pressure is lower. For this reason, leaks may develop at points of inadequate gasket pressure. In order to repair a leak, it may be necessary to close down the line, back off the follower ring and shim up the gasket in the low pressure zones. This is obviously disadvantageous.

Large diameter couplings also present difficulties in shipping, handling and installing because of their size and weight. As the demand for large diameter couplings of any one size is relatively small, such couplings are usually made to special order for each job and are accordingly more expensive than stock couplings.

It is an object of the present invention to provide an improved pipe coupling that overcomes the foregoing difficulties and disadvantages.

It is another object of the invention to provide a pipe coupling which is provided with means for effectively resisting the tendency of the followers to roll.

It is a further object of the invention to provide an improved follower construction for pipe couplings for large diameter pipe.

In accordance with the invention, there is provided a coupling of the type comprising a middle ring and gaskets receivable in the axial ends of the ring, the coupling including followers which are made up of a plurality of relatively small sections that are manufactured and shipped separately and assembled when being installed on the pipe. The sections are constructed to be assembled in such manner that when the followers are drawn toward the middle ring by bolts or like compression means, rolling of the followers is positively prevented while at the same time adequate gasket pressure is obtained at all points. The follower sections are characterized by a construction which includes torque arms which are adapted to bear against the outer surface of the middle ring to oppose the turning moment which tends to roll the followers. It is a feature of the invention that, when assembled on the pipe, the sections of the follower are individually adjustable so as to make possible the application of uniform gasket pressure all around the circumference of the coupling. Moreover, if a leak should occur at one section, that section can be tightened to correct the leak without disturbing the other sections and without interrupting service in the pipe line. Since the couplings are made up of relatively small pieces, they can be more easily manufactured, shipped, handled and installed than has heretofore been possible. In addition, the nature of certain parts is such that standard parts can be made up in large quantity and kept in stock, to be used as required in making up couplings of different sizes. The cost of production is thereby materially reduced.

Other objects, features and advantages of the invention will be apparent from the following description and claims and from the accompanying drawings which show illustrative embodiments of the invention and wherein:

Referring to the drawings and more particularly to Figs. 1 to 5, a coupling constructed in accordance with the invention is indicated generally by the reference numeral 30 and is shown in position around a pipe section 32. As illustrated in the drawings, the coupling 30 comprises a middle ring 34 having gasket recesses 35 at its opposite ends, annular gaskets 36 seated in the gasket recesses, and followers 38 for applying sealing pressure to the gaskets 36.

The middle ring 34 comprises a ring or band of high tensile strength material, for example steel, and may be formed as an integral endless sleeve, or split axially at one point in its circumference, or composed of a plurality of arcuate sections which are constructed to be joined together end to end. The central or intermediate portion 39 of the middle ring 34 has an internal diameter slightly larger than the outside diameter of the pipe 32 so that the ends of the pipe sections will be received snugly in the middle ring. The end portions 40 of the middle ring 34 are formed with a somewhat larger inside diameter so as to define the annular gasket recesses 35 between the end portions of the middle ring and the wall of the pipe. The gasket recesses are preferably, as shown, of trapezoidal cross section, each having a substantially cylindrical portion 41 and a tapered portion 42.

The gasket 36 is formed from elastomer material, this term being used generically to include natural or synthetic rubbers, and other elastomeric compounds, or compositions having like properties and characteristics, and is sufficiently resilient and yielding to provide a fluid-tight seal when pressed into engagement with the middle ring and pipe by the follower, and yet sufficiently firm and tough to resist objectionable cold flow through the clearances normally provided between the surfaces that confine it. The gasket may be in the form of a continuous ring or it may be a split ring formed, for example, by a length of the gasket material wrapped around the pipe with its free ends abutting. The cross sectional shape of the gasket conforms approximately to that of the gasket recess. As illustrated in the drawings, the gasket is of trapezoidal cross section with a substantially rectangular portion 43 and a tapered or wedge-shaped inner portion 44. The thickness of the gasket in a radial direction is approximately equal to that of the gasket recess. However, the width of the gasket in an axial direction is less than the axial depth of the gasket recess, so that the gasket does not fill the recess. The end portion of the middle ring thus projects in an axial direction beyond the gasket.

Pressure is applied to the gaskets to make a fluid-tight seal between the pipe and the middle ring by means of the followers 38 which are disposed at opposite ends of the middle ring 34. Each of the followers is made up of a plurality of identical sections which are manufactured and shipped as individual units and are assembled when installing the coupling on the pipe. For large diameter pipes, the followers constructed in accordance with the invention are composed of a relatively large number of sections, preferably at least six, and for larger pipe as many as twelve or more. In the coupling which is shown by way of example in Fig. 1, each follower ring has twenty-four sections. The individual sections are hence relatively small even for very large diameter pipe.

One of the follower sections is shown on an enlarged scale in Figs. 2 to 5 and comprises a follower bar portion 45, which engages the outer surface of the gasket, a pressure-applying member 46 which, for convenience, is herein referred to as a pressure plate, although it may be of channel, bar or other form, and one or more torque arms 58 extending along the outside of the middle ring in a direction lengthwise of the pipe and bearing on the middle ring. Thus as viewed in axial section (Fig. 2) the follower is U-shaped with the follower bar portion 45 and torque arm 58 constituting the arms of the U and joined by the radial portion 46. The follower bar 45 is an arcuate member having a radially inner face 47, a radially outer face 48, an axially inner face 49 and an axially outer face 50, and opposite ends 51. The curvature of the bar in a lengthwise direction corresponds approximately to the circumferential curvature of the pipe wall and the middle ring 34. The bar is shown as being of rectangular cross section with a thickness in a radial direction slightly less than the radial thickness or depth of the gasket recess 35 so that the follower bar can slide freely into the gasket recess and yet not leave spaces large enough to permit objectionable extrusion of the gasket material when pressure is applied. On the radially inner face 47 of the follower bar, there are advantageously provided a plurality of small spacing elements 55 which in the embodiment illustrated are small bumps and which are intended to space the follower bar slightly from the pipe for the purpose of permitting the testing of the gasket pressure, as will be explained below.

Each of the pressure plates 46 shown in Figs. 1 to 5 extends radially from the follower bar 45 and while each pressure plate is advantageously trapezoidal in shape, as shown, it may be rectangular, triangular or have other convenient geometric forms. Extending axially inwardly from the inner face of each pressure plate shown in Figs. 1 to 5 are two spaced apart torque arms 58 which have a substantially horizontal portion adapted to overlie the end portions of the middle ring and radially-inwardly directed end portions or fingers 59 adapted to engage the outer surface of the middle ring. An aperture 60 is formed in the pressure plate between the torque arms for reception of the bolt 62 by means of which the followers are forced axially inwardly against the gaskets. As the bolts 62 are tightened to apply pressure to the gaskets the tendency of the bolts to cause the followers to roll is opposed by reason of the contact of the end portions of the torque arms against the middle ring and the tendency is nullified, with the result that a smooth and even application of pressure to the gaskets results.

Figure 1:
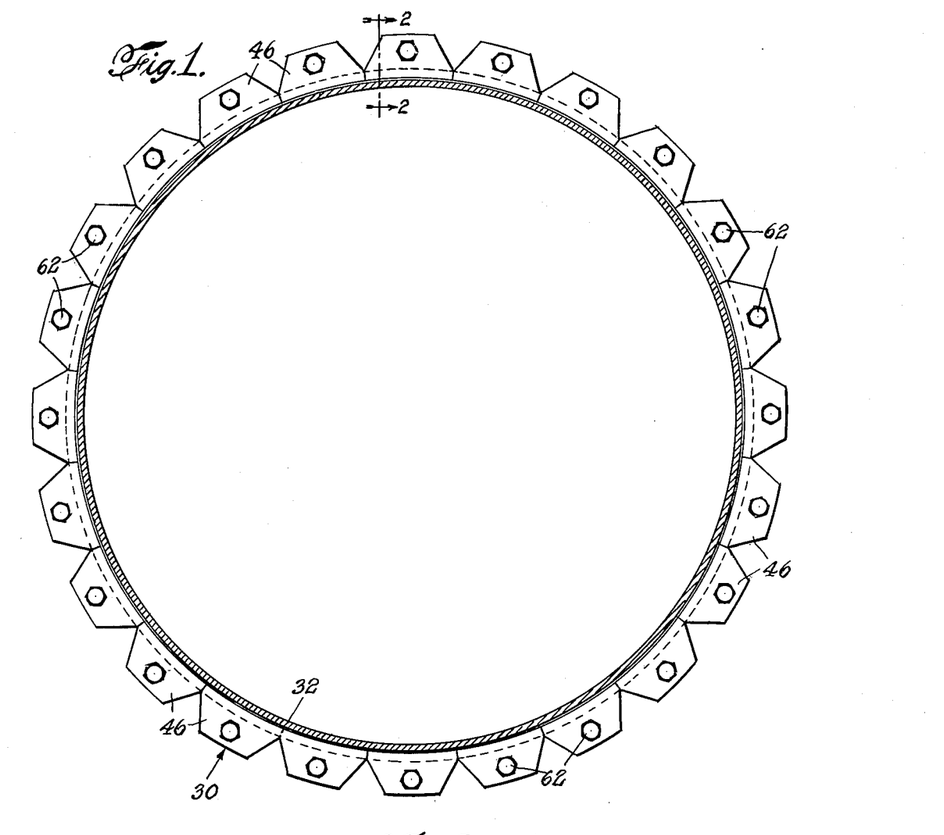
Fig. 1 is an end elevational view of a coupling embodying features of the present invention, the coupling being illustrated in position upon a pipe.
Figure 2:
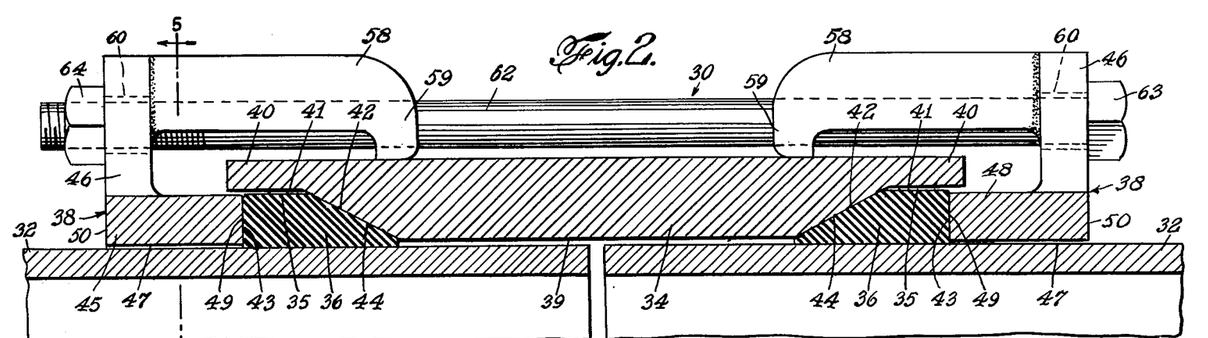
Fig. 2 is an axial sectional view, on an enlarged scale, taken approximately along the line 2—2 of Fig. 1.
Figure 3:
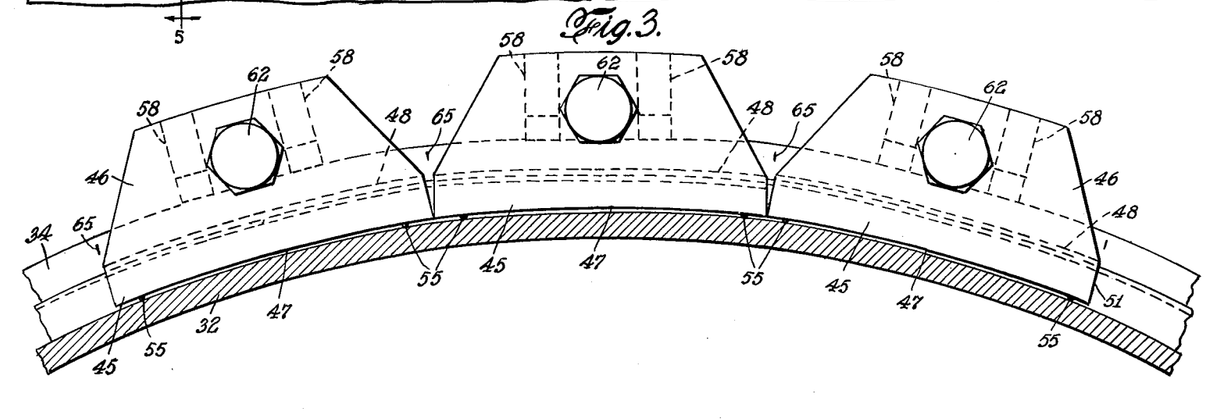
Fig. 3 is an enlarged view of a portion of the coupling as shown in Fig. 1.
Figure 4:
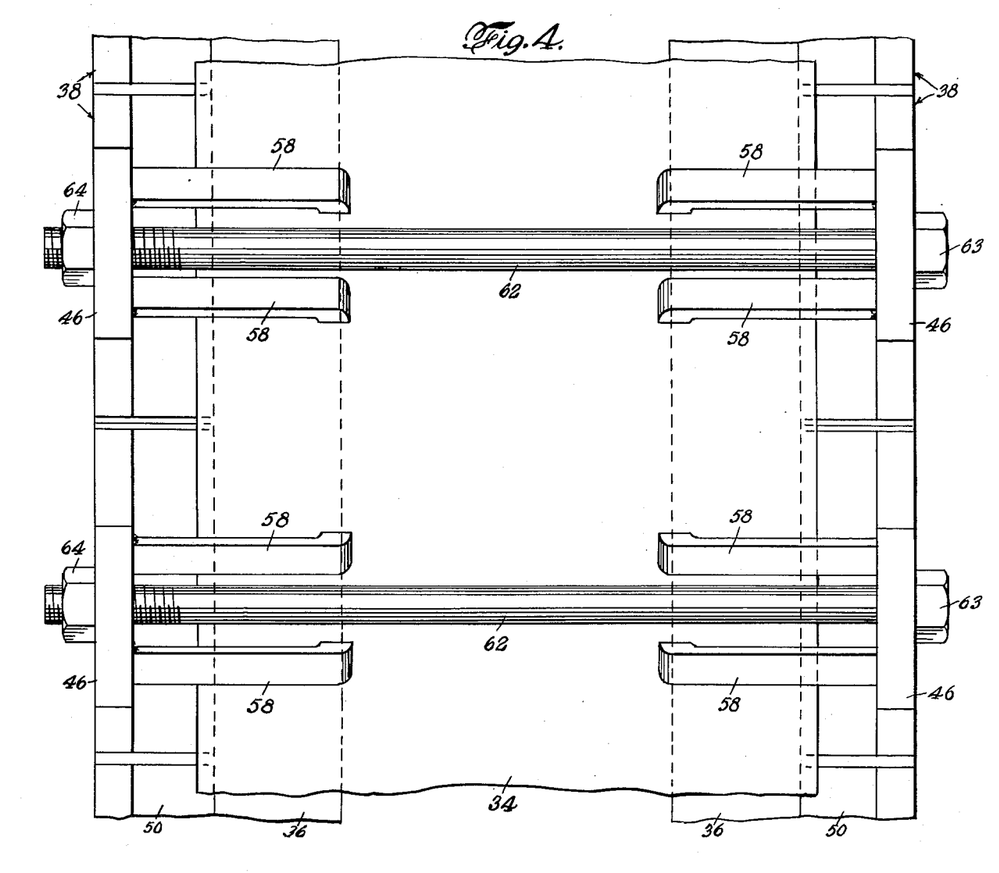
Fig. 4 is a fragmentary plan view, also on an enlarged scale, of the coupling of Figs. 1 to 3.
Figure 5:
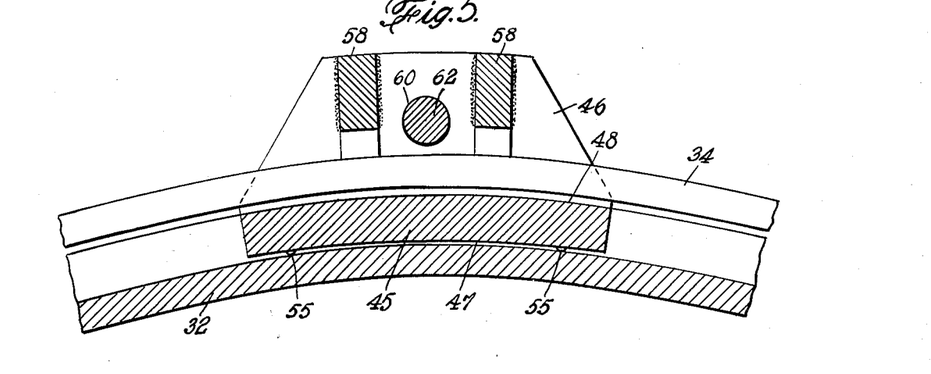
Fig. 5 is a sectional view taken approximately along the line 5—5 of Fig. 2 to show details of construction of one of the follower sections.
Figure 6:
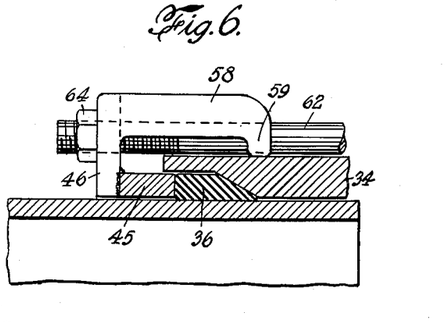
Fig. 6 is a sectional view showing a modified form of the follower construction of Fig. 2.
Figure 7:
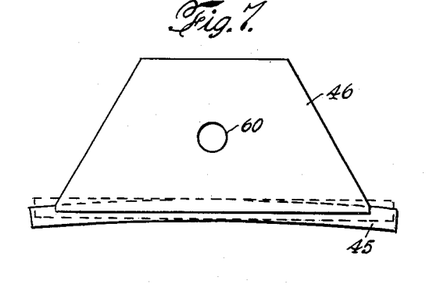
Fig. 7 is an end elevation of the construction shown in Fig. 6.

The pressure plates may be formed integrally with their associated follower bar portions, as shown in Fig. 2 or the pressure plates may be separately formed and welded to the follower bar portions, as shown in Figs. 6 and 7. Similarly, the torque arms may be formed integrally with the pressure plates as shown in Fig. 6, or they may be welded thereto, as shown in Fig. 2. When the pressure plates and the follower bar portions are joined by welding, the parts are assembled by placing the pressure plate on the bar portion so that the inner edge portion of the plate overlies and engages the axially outer edge face of the bar and the torque arms extend across the bar and beyond its axially inner face. The end portions of the bar portion will advantageously project in a circumferential direction beyond the lower corners of the pressure plate. In couplings for larger sizes of pipes, the inner edge of the pressure plate is straight and cuts across the arcuate face of the follower bar as a chord. The pressure plate hence need not be fitted to a particular size of pipe and the same pressure plates may be used with follower bars which vary in curvature and length, as indicated in broken lines in Fig. 7. For use on smaller sizes of pipe, the radially inner edge of the pressure plate may be cut off at its center, if necessary, so that it does not project beyond the radially inner face of the follower bar 45.

In assembling the coupling on the pipe, the middle ring 34 is placed in position around the abutting pipe ends, or over a damaged and leaking portion of an existing pipe line if the coupling is to be used as a repair clamp, and the gaskets 36 are positioned in the gasket recesses 35. The followers 38 are then assembled on the pipe in pairs, each pair being formed by a section of one follower and an axially-aligned section of the follower at the other end of the middle ring. The two sections of the follower pair are placed on the pipe with the torque arms 58 of one pressure plate 46 facing the torque arms of the other, with the torque arms overlying and bearing against the outer surface of the middle ring. The radially inner faces 47 of the follower bars 45 are placed with the spacing elements 55 in contact with the external surface of the pipe and the axially inner portions of the follower bars are slipped into the gasket recesses 35 of the middle ring 34 so that the axially inner faces 49 of the bars engage the gaskets 36. The pressure plates are thus disposed approximately perpendicularly to the pipe in radially outwardly directed planes. The pressure plates 46 of each pair are interconnected by tension members which, in the embodiment shown, take the form of bolts 62 having heads 63 and nuts 64. The bolts 62 extend through the apertures 60 near the base portions of the pressure plates and are preferably as close to the follower bar as is permitted by the middle ring and may even extend through portions of the middle ring, as will be described below. Tightening of the bolts 62 draws the pressure plates 46 toward one another, and thereby presses the follower bar portions 45 axially-inwardly into the gasket recesses to apply sealing pressure to the gaskets 36.

Pairs of follower sections are installed successively around the pipe until a full complement of sections is in place. The follower bar portions of successive sections are disposed end to end and may either be in actual contact or spaced slightly from one another, it being understood that a certain spacing is permissible without giving rise to objectionable cold-flow of the gasket material into the spaces between the follower bar portions. This permits adjustment of the circumferential length of the composite follower ring so that the follower can accommodate itself to over-sized or under-sized pipes of any given "nominal" pipe size. To facilitate positioning the follower sections around the pipe and to assure that they are uniformly distributed, suitable indicia, such as notches or punch marks, may be provided on the end of the middle ring, as indicated at 65 in Fig. 3.

After all of the follower sections have been assembled loosely on the pipe, they are preferably tightened progressively. Since each section of a follower is independent of the other section, it can be tightened to exactly the right degree to provide the gasket pressure desired. This is ordinarily determined by the use of a suitable torque wrench. As a further test of gasket pressure, the point of a trowel or other thin instrument can be inserted between the follower bar and the pipe in the space provided by the spacing elements 55 in order to "feel" the gasket. If it feels hard, the gasket is known to be under sufficient pressure. If the gasket feels soft, or if it is possible to insert the point of the trowel between the gasket and the pipe, gasket pressure is inadequate and the appropriate bolt is tightened further.

Although the sections of a follower are not connected with one another, they are nevertheless held in position when installed on the pipe in the manner above described. The torque arms 58, which bear against the middle ring and resist the bending moment imposed by the bolts, in conjunction with the bolts and the resistance of the gaskets 36, hold the follower sections in a stable position approximately perpendicular to the pipe. The forces acting on the pressure plates balance one another so that there is no tendency to roll. By having the bolts 62 positioned as close as possible to the follower bar portions 45 which engage the gaskets 36, i. e. closely overlying the surface of the middle ring 34, most of the pull of the bolts is applied to produce gasket pressure, the remaining portion being effectively taken by the torque arms 58. Owing to the fact that the follower bar portions 45 are interlocked between the pipe and the end portions of the middle ring 34, movement of the follower bars in a radially outward direction is prevented.

It will be apparent that the invention is susceptible of many applications and that our coupling is not limited to the structural details shown in Figs. 1 to 7 above described. The coupling may take various modified forms and a few illustrative embodiments of such modifications are shown by way of example in Figs. 8 to 25.

Figure 8:
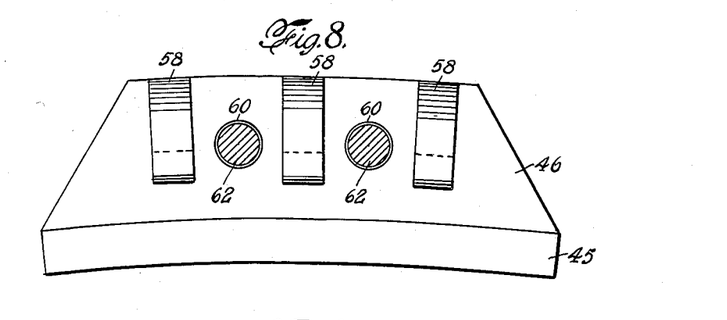
Fig. 8 is an end elevational view of a follower section similar to those shown in the preceding figures but of somewhat modified construction.
Figure 9:
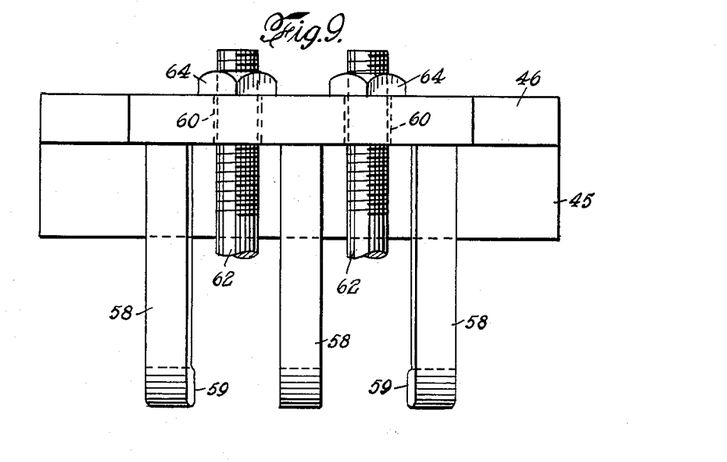
Fig. 9 is a plan view of the follower section shown in Fig. 8.

In the embodiment shown in Figs. 8 and 9, for example, each follower section is connected to its axially opposite complementary follower section by two circumferentially spaced bolts 62 and the pressure applying plate member 46 is formed with two apertures 60 to accommodate the two bolts and has secured to it three axially-extending torque arms 58 similar to those shown in the previously-described embodiment. This type of construction is more particularly suitable when a lesser number of follower sections are employed to make up the follower ring and thus each section represents a greater circumferential arc.

Figure 10:
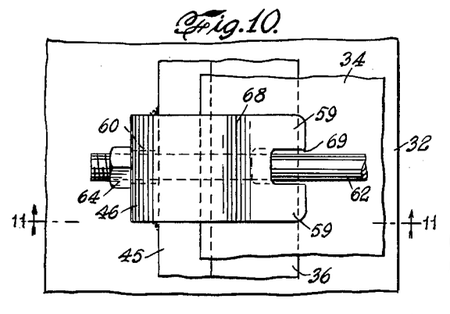
Fig. 10 is a plan view of another embodiment of a follower section of the invention.
Figure 11:
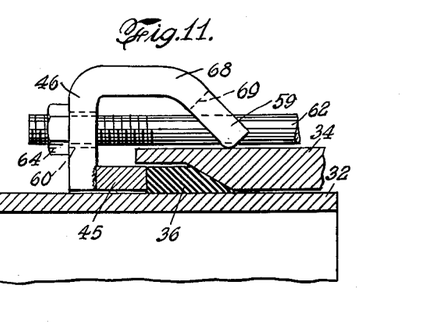
Fig. 11 is a sectional view of the follower section taken approximately along the line 11—11 of Fig. 10.

As shown in the embodiment of Figs. 10 and 11, the torque arms, instead of being separate as in the embodiment of Figs. 6 and 7, for example, may be integrally formed from a torque arm strip 68 which is integral with or secured as by welding to the pressure applying plate 46 which, as in the previous embodiments, is secured to the follower bar portion 45 and is formed with a bolt aperture 60. The axially-inner end of the torque arm strip 68 is notched at 69 to permit passage of the bolt and to define the two torque fingers 59 which bear against the middle ring.

Figure 12:
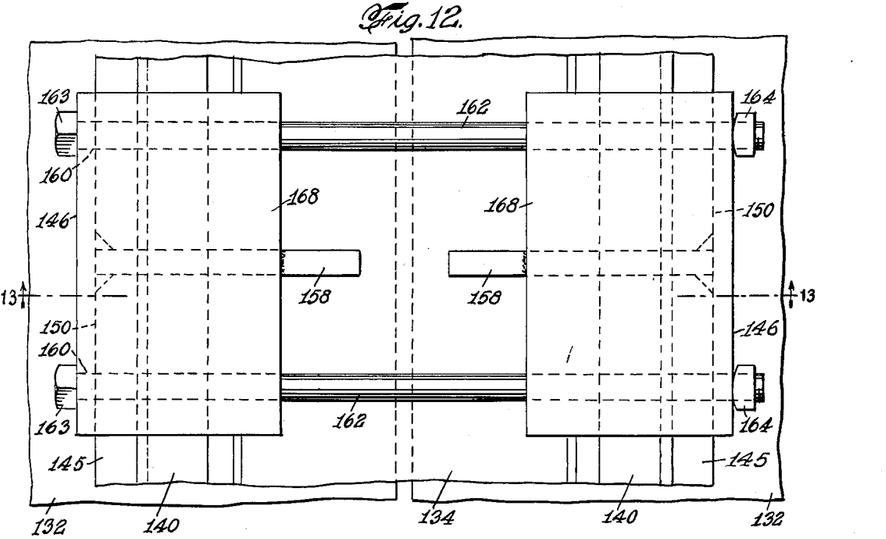
Fig. 12 is a plan view of a coupling provided with follower sections constructed in accordance with another embodiment of the invention.
Figure 13:
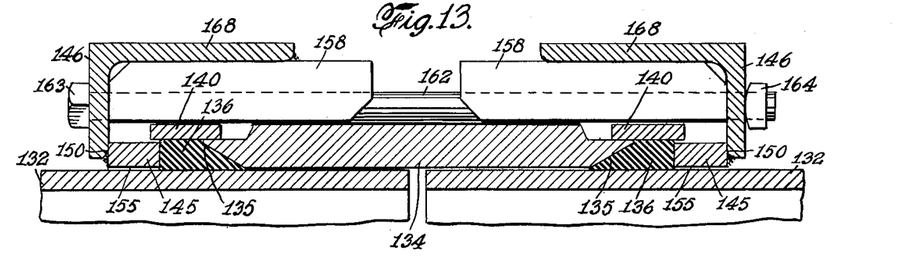
Fig. 13 is an axial sectional view taken approximately along the line 13—13 of Fig. 12.

In another embodiment, each follower section may be traversed by a pair of bolts and yet have only one torque arm and it will be seen that the middle ring may be modified as well. Referring more particularly to Figs. 12 and 13, wherein parts corresponding to those shown in the previous embodiments are identified by the same reference numerals to which 100 has been added, the follower bar portion 145, which is povided with spacing elements which are defined by axially-extending ribs 155, has secured to its axially outer face 150 a pressure applying plate 146. Integral with the plate 146 and extending axially inwardly is a torque arm strip 168. It will be apparent that the plate 146 and the strip 168 may be defined by an angle iron of suitable length and that the pressure applying plate portion of the angle iron may have a straight edge and be secured, as by welding, to the slightly arcuate follower bar portion 145 as shown in Fig. 7. The plate portion 146 is formed with two circumferentially spaced bolt apertures 160 for reception of the bolts 162 of the opposed complementary follower sections and between the bolt apertures is positioned a torque arm 158 which is secured, as by welding, both to the plate portion 146 and to the torque arm strip 168. The middle ring 134 against which the torque arm 158 of each follower section bears has end portions provided by strips 140 which define the gasket recesses 135 for reception of the gaskets 136 and the inner portions of the follower bars 145.

Figure 14:
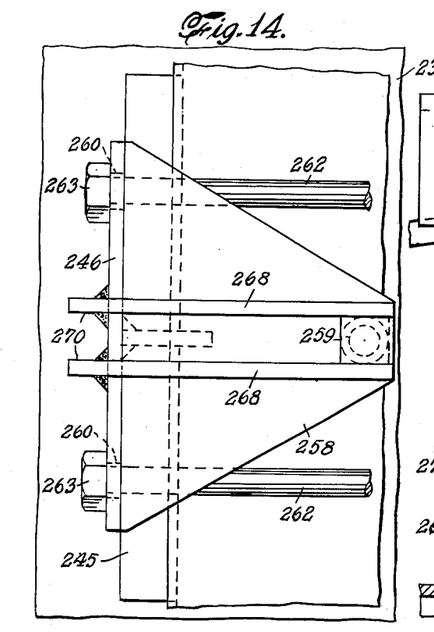
Fig. 14 is a plan view of another follower section embodying features of the present invention.
Figure 15:
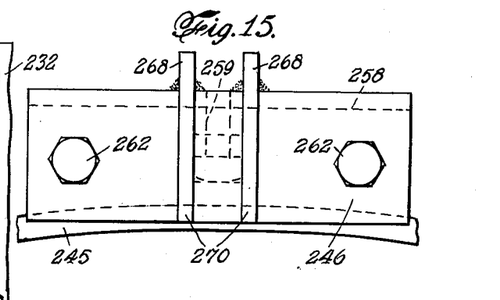
Fig. 15 is an end elevational view of the follower section shown in Fig. 14 as seen from the left of this figure.
Figure 16:
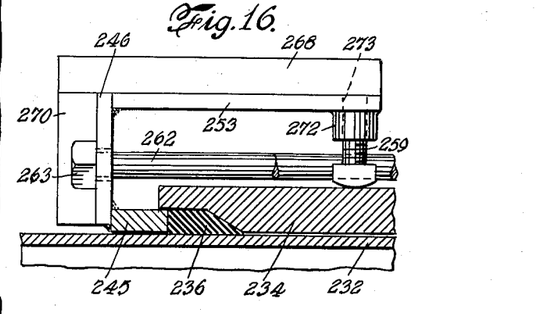
Fig. 16 is a side elevational view of the follower section shown in Figs. 14 and 15.

In the foregoing embodiments, the portions of the torque arms which bear against the middle ring are integral with the remainder of the arms. In some cases, however, it is advantageous to provide for adjustability in the bearing portions or fingers of the torque arms. Embodiments of the invention showing readily adjustable fingers are illustrated by way of example in Figs. 14 to 18. Referring more particularly to Figs. 14 to 16, wherein parts corresponding to those shown in the embodiments of Figs. 1 to 9 are given the same reference numbers to which 200 has been added, there is shown a follower bar section defined by a follower bar portion 245, a pressure applying plate 246 provided with bolt apertures 260, and a torque arm 258 extending axially inwardly from the plate. Overlying the pressure applying plate 246 are reinforcing ribs 270 which are joined by ribs 263 overlying the torque arm. The adjustable middle ring-engaging torque arm finger in the embodiment illustrated is provided by a bolt 259 which is threadedly engaged in a nut 272 secured to torque arm 258 and coinciding with an aperture 273 in the arm for reception of the end of the bolt. By means of the adjustable finger 259 it is possible to readily compensate for any irregularities in the surface of the middle ring and to insure radial positioning of the pressure applying plate 246.

Figure 17:
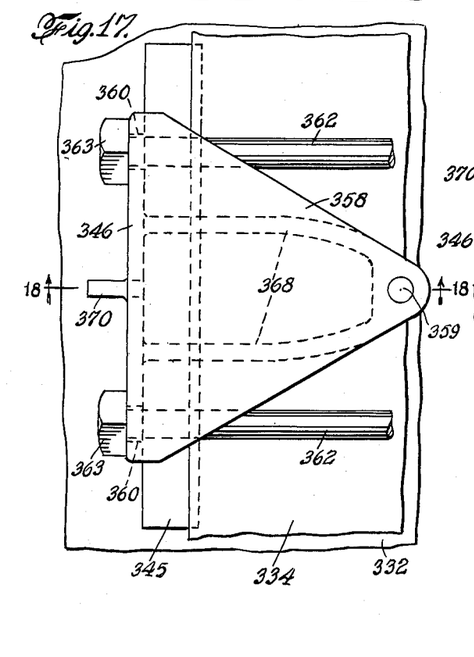
Fig. 17 is a plan view of another follower section constructed in accordance with the invention.
Figure 18:
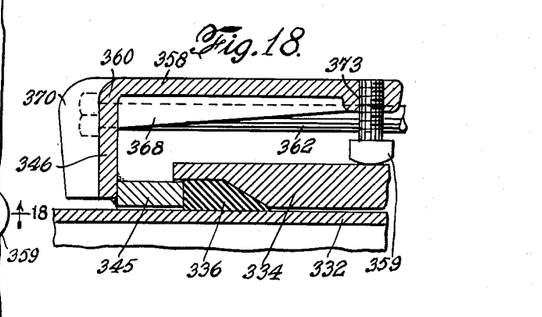
Fig. 18 is a sectional view taken approximately along the line 18—18 of Fig. 17.

A modified embodiment of a follower ring section having an adjustable torque finger is shown in Figs. 17 and 18 wherein parts corresponding to those shown in previous embodiments are given like reference numbers to which 300 has been added.

In this embodiment the follower bar portion 345 has secured to it, as by welding, a unitary casting which defines the pressure applying plate 346, formed with two bolt apertures 360 for reception of the bolts 362, and the axially-extending torque arm 358, the casting also being formed with a plate reinforcing rib 370 and arm reinforcing webs or strips 368. The adjustable finger of the torque arm 358 is provided by a bolt element 359 which is threadedly engaged in a threaded aperture 373 formed substantially at the apex of the triangular torque arm. As in the previously described embodiment, the adjustable finger makes it possible to set the position of the follower section as desired.

Figure 19:
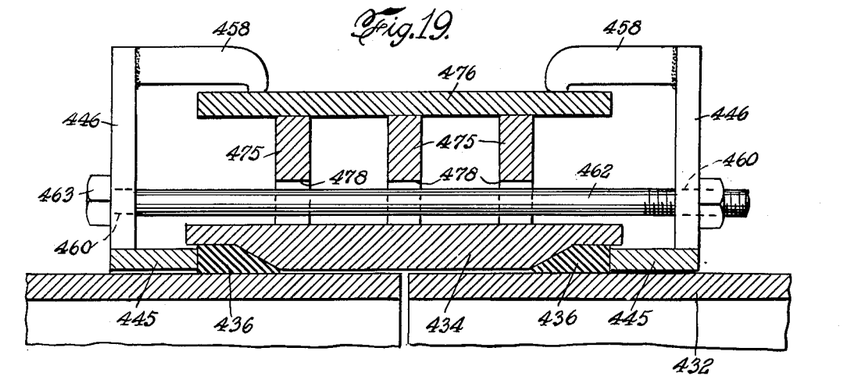
Fig. 19 is an axial sectional view of another modified form of follower ring particularly suitable for use with a middle ring of a type embodying a reinforcing ring spaced radially from the main body of the middle ring.

The follower sections may be modified to the extent necessary to cooperate with modified forms of the middle ring. In Fig. 19, for example, wherein like reference numerals to which 400 has been added are used, the middle ring 434 is provided on its outer surface with radially-extending circumferential ribs 475 which are confined within an encircling circumferential band 476. As in the previous embodiments, the follower section includes a follower bar portion 445 having an inner end which extends into the gasket recess defined by the middle ring to engage the gasket and the bar portion is engaged by a pressure applying plate 446 which has a sufficient radial length to extend at least to the band 476 and is connected to a torque arm 458 which bears against the outer surface of the circumferential band. The plate 446 is provided with at least one aperture 460 for reception of a bolt 462 and aligned apertures 478 are provided in the ribs 475 to permit passage of the bolt between the opposed pair of follower sections. Upon tightening of the bolt 462 to move the follower sections axially inwardly to apply sealing pressure to the gaskets, the torque arms 458 press against the band 476 and forces which tend to roll the follower sections are effectively nullified.

Figure 20:
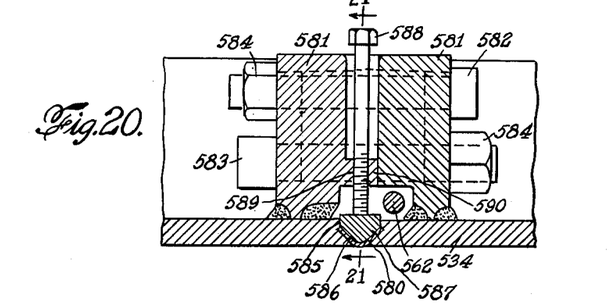
Fig. 20 is a side elevational view, partly in section to show details of construction, of a portion of a coupling constructed in accordance with the invention and including a middle ring provided with an axial split.
Figure 21:
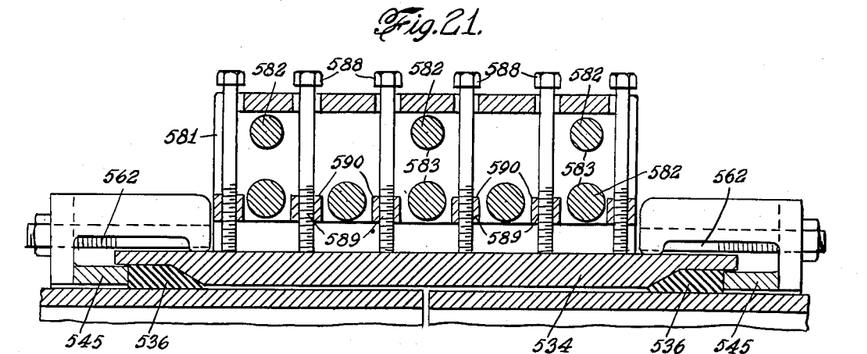
Fig. 21 is a transverse sectional view taken approximately along the line 21—21 of Fig. 20.

The middle ring may be a single continuous cylindrical band or it may be split axially at one or more points, the split ends being suitably connected in fluid-tight relationship. In Figs. 20 and 21 there is shown, by way of example, follower sections constructed in accordance with the embodiment of Figs. 6 and 7 associated with a split or sectional middle ring 534 with fluid-tight joints between the ends of the middle ring sections. Where the middle ring 534 is divided or split axially, as indicated at 580, it is provided with "side bars" 581 secured, as by welding, to the surface of the ring adjacent the split. Circumferentially extending bolts 582 pass through the two sets of apertures 583 in the side bars for drawing the side bars together when the nuts 584 are tightened to connect the ends of the middle ring sections. End portions of the middle ring 534 project slightly beyond the side bars 581 and are beveled as indicated at 585 to form a V-shaped juncture. A sheet-form packing or gasket 586 is pressed against the beveled ends 585 of the middle ring sections by a follower bar 587 which has a V-shaped inner surface and is pressed radially inwardly by means of a plurality of set screws 588 which are threadedly engaged in tapped holes 589 formed in projections 590 extending from one of the side bars 581 between the bolts 582.

After the middle ring sections have been connected by the bolts 582 and drawn up snugly, although not necessarily tightly, on the pipe, the set screws 588 are progressively tightened to force the V-shaped follower 587 radially inwardly, and thereby press the gasket 586 against the beveled ends 585 of the middle ring sections at the split 580 to provide a fluid-tight joint. It will be understood that the gasket 586 and follower 587 extend transversely of the middle ring from one annular gasket 536 to the other to complete the transverse seal. As shown, the bolt 562 between the end follower sections passes between the side bars 581.

While the follower section construction of Figs. 6 and 7 has been shown in association with a split ring it will be apparent that other follower sections constructed in accordance with the invention, including those herein described, may be so employed so long as the ends of the side bars are spaced sufficiently inwardly of the edge of the middle ring to accommodate the torque arm of the follower, as shown.

In the foregoing, the pressure applying plates with their torque arms have been described as being secured, e. g. by integral formation or by welding, to the follower bar. The pressure plates may, however, be separate members and are not necessarily permanently connected to the follower bar. In this type of construction, the follower bar 645 may be made as an endless or split ring or may be divided into two, three or more segments, with a plurality of pressure plates applied to each segment. Thus the follower bar 645 which forms the gasket engaging portion of the follower may be common to a plurality of follower sections, the term section being used to designate a pressure plate, the associated torque arm or arms and the adjacent portion of the follower bar. As illustrated by way of example in Figs. 22 to 25, the follower bar 645 is continuous between a plurality of pressure plates 646 each formed with a bolt aperture 660 between two axially-extending torque arms 658 having end portions 659 bearing against the outer surface of middle ring 634. While the pull of the bolts 662 on the pressure plates 646 is transmitted to the follower bars 645 by the engagement of the base portions of the pressure plates on the follower bars without depending on any connecting means, it is desirable to provide some means for positioning the pressure plates with respect to the follower bars to prevent any possibility of the pressure plates slipping radially outwardly. As shown in Figs. 22 to 25, the pressure plates 646, which in the particular embodiment have central portions of reduced thickness and ends of increased thickness integral with the torque arms, are provided on their inner faces near the radially inner edges of the plates with projections 691 which fit into suitable depressions 692 provided in the axially outer faces of the follower bars 645. The projections 691 may be in the form of continuous ribs or can be separate projections or bumps. Likewise, the depressions 692 in the follower bars may be continuous grooves or spaced recesses. In the latter case, the interengaging projections and recesses may serve to position the pressure plates in a circumferential direction around the follower rings as well as to prevent them from slipping off the ring in a radially outward direction.

Figures 22, 26:
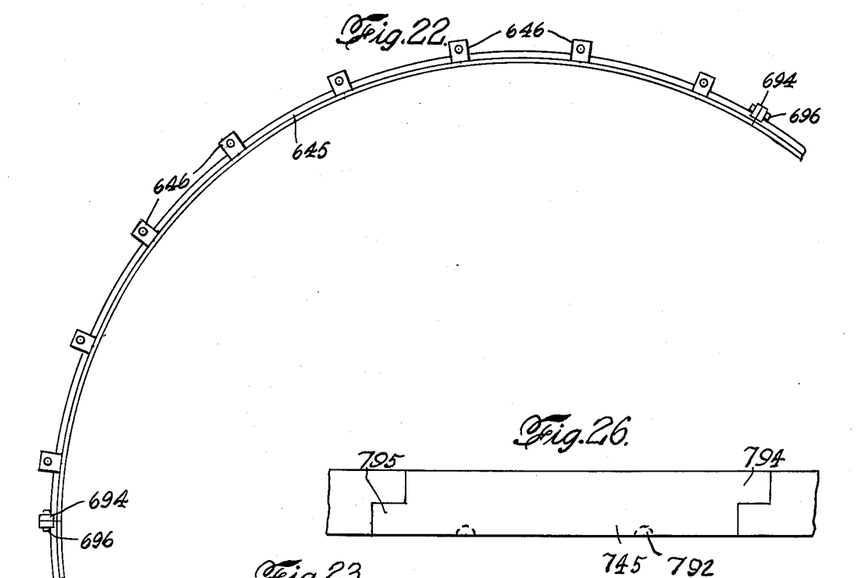
Fig. 22 is an end elevational view of another embodiment of a follower section of the invention.
Fig. 26 is a fragmentary elevational view of a modified form of follower.
Figures 23, 24, 25:
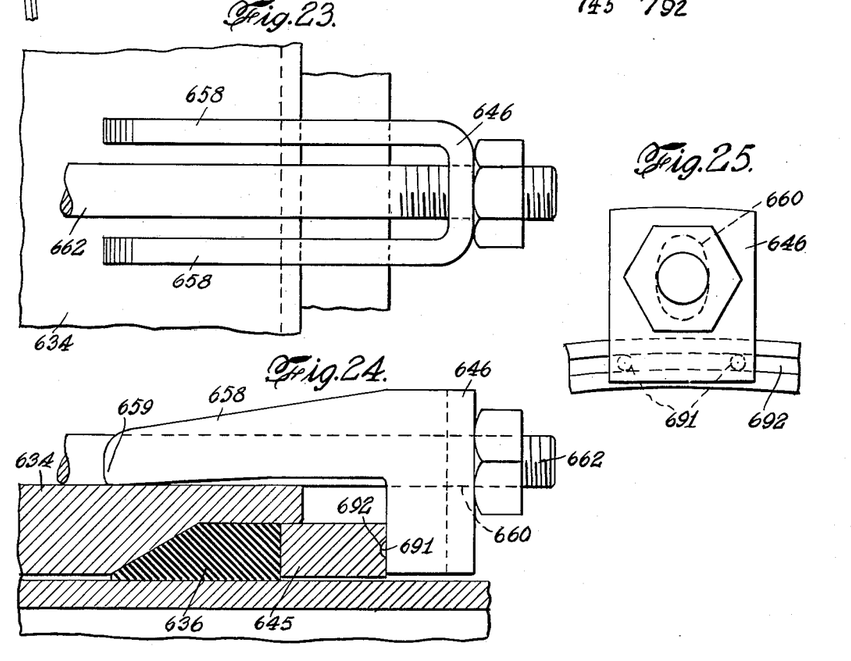
Fig. 23 is a fragmentary plan view of a portion of the follower section shown in Fig. 22.
Fig. 24 is a side elevational view of the structure shown in Fig. 23.
Fig. 25 is an end elevational view thereof.

Advantageously, although not necessarily, the ends of the follower bars of the type shown in Figs. 22 to 25 may be interconnected. For this purpose, as shown in Fig. 22, the follower bar ends are provided with flanges 694 which are provided with bolt apertures to receive connecting bolts 696. Instead of bolted interconnections as shown in Fig. 22, the follower bars may have overlapping ends to provide a so-called "ship-lap" joint, as shown in Fig. 26, wherein each follower bar 745 is provided with a tongue 794 extending from one axial face and a complementary tongue 795 extending from the other axial face. Like the follower bars shown in Figs. 22 to 25, follower bars 745 are formed with depressions 792 for reception of corresponding projections on the pressure plates, as shown in Figs. 22 to 25.

While the invention has been illustrated and described with reference to certain preferred embodiments thereof, it will be obvious that various changes and modifications in addition to those above mentioned may be made without departing from the scope of the invention as defined in the appended claims. For example, although the drawings show a coupling having two followers at opposite ends of a middle ring, it will be understood that, in some instances, a single follower may be used, e. g. on a bell and spigot joint, suitable anchoring means being provided for the pressure-applying means, e. g. the bolts. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What we claim and desire to secure by Letters Patent is:

1. In a coupling for plain end pipe, a continuous middle ring for receiving plain end portions of two pipe lengths to be coupled, opposite end portions of the middle ring defining annular gasket recesses open to the ring ends and to the inner surface of the ring, annular gaskets in said recesses, followers for applying pressure to said gaskets, each of said followers comprising a plurality of like sections each of which has a circumferential extent of not more than ninety degrees and, when viewed in a section including the axis of the ring and follower, is U-shaped with arms of unequal length and comprises a shorter inner arm portion entering axially into said gasket recess to apply pressure to the gasket, adjacent follower sections having gasket-engaging portions that are substantially contiguous with one another in a circumferential direction to provide a substantially continuous ring engaging the gasket, a longer outer arm portion extending along the outside of the ring in a direction lengthwise of the ring but terminating substantially short of the gasket recess at the opposite end of said ring, and a radial portion connecting said inner and outer arm portions and spaced from the end face of the adjacent ring end, the radial portion of each of said follower sections being provided with at least one bolt hole, through bolts extending through aligned bolt holes in the follower sections at opposite ends of said ring, and nuts on said bolts, the tightening of said nuts on said bolts drawing the opposite followers toward one another to apply pressure to the gaskets and the longer outer arms of said follower sections having at least one portion extending radially inwardly beyond said bolts to form a bearing surface bearing on the outside of the ring to counteract torque resulting from the pull of said bolts and the resistance of said gaskets, said bearing surfaces being spaced circumferentially from said bolts, and said longer arms of the follower sections having clearance from said bolts so that the bolts are free to move in a lengthwise direction to equalize the pressure on the gaskets at the opposite ends of the ring, the sum of the bearing surfaces of the outer arm and the bolt holes extending through the follower sections being at least three for each section, said bolt holes and bearing surfaces being disposed symmetrically in each section with respect to a plane midway between the ends of the section and including the axis of the ring.

2. A pipe coupling according to claim 1, in which each of said follower sections has a central bolt hole with a bolt therein, and in which said longer outer arm of each of said sections is bifurcated to provide two circumferentially spaced-apart bearing surfaces bearing on the outside of said middle ring on opposite sides of said bolt.

3. A pipe coupling according to claim 1, in which each of said follower sections has two circumferentially spaced bolt holes with a bolt in each of said holes and in which said longer outer arm of each section has a bearing surface bearing on said middle ring between said bolts.

4. A pipe coupling according to claim 1, in which each of said follower sections has a plurality of bolt holes with a bolt in each of said holes and in which said longer outer arm of each of said sections comprises a plurality of portions extending radially inwardly beyond said bolts and bearing on said middle ring at a plurality of circumferentially spaced points.

5. A pipe coupling according to claim 1, in which said portions of said longer outer arms extending radially inwardly and bearing on said middle ring are adjustable relative to said arms in a direction radial of said ring.

6. A pipe coupling according to claim 1, in which each of said followers comprises a gasket-engaging portion disposed in said gasket recess and removably associated with the remainder of the follower by interfitting projections and recesses.

7. In a coupling for plain end pipe, a continuous middle ring for receiving plain end portions of two pipe lengths to be coupled, opposite end portions of the middle ring defining annular gasket recesses open to the ring ends and to the inner surface of the ring, annular gaskets in said recesses, followers for applying pressure to said gaskets, each of said followers comprising a plurality of like sections each of which has a circumferential extent of not more than ninety degrees and is a unitary structure comprising an arcuate follower bar having an inner portion which enters axially into said gasket recess to apply pressure to the gasket and an outer portion which projects axially beyond the respective end of said middle ring, a radial portion that projects radially outwardly from the outer portion of said follower bar, said radial portion being axially spaced from the end of the middle ring and extending radially outwardly beyond the middle ring and at least one outer arm extending axially from said radial portion in a direction toward the opposite follower and overlying said middle ring, the radial portion of each of said follower sections having two bolt holes, through bolts extending through aligned bolt holes in the follower sections at opposite ends of said ring and nuts on said bolts, the tightening of said nuts on said bolts drawing the opposite followers toward one another to apply pressure to the gaskets, said arcuate follower bars of adjacent sections being substantially contiguous in end-to-end relation to provide a substantially continuous ring, said outer arms having portions extending radially inwardly beyond the bolts and having bearing surfaces bearing on the outside of the middle ring at points axially inwardly of said gasket recesses to counteract torque resulting from the pull of said bolts and the resistance of said gaskets, said bearing surfaces being spaced circumferentially from said bolts and said outer arms of the follower sections having clearance from said bolts so that the bolts are free to move in a lengthwise direction to equalize the pressure on the gaskets at opposite ends of the ring, the bolt holes and bearing surface or surfaces of each section being disposed symmetrically with respect to a plane midway between the ends of the section and including the axis of the ring.

References Cited in the file of this patent

UNITED STATES PATENTS

| | | |
|---|---|---|
| 734,677 | Dean | July 28, 1903 |
| 782,482 | Brockett | Feb. 14, 1905 |
| 1,196,785 | Johnson | Sept. 5, 1916 |
| 1,926,422 | Armbruster | Sept. 12, 1933 |
| 1,986,419 | Taylor | Jan. 1, 1935 |
| 1,993,927 | Gavin | Mar. 12, 1935 |
| 2,059,573 | Gavin | Nov. 3, 1936 |
| 2,087,752 | Carson | July 20, 1937 |

FOREIGN PATENTS

| | | |
|---|---|---|
| 284,282 | Great Britain | May 17, 1928 |
| 483,121 | Great Britain | Apr. 12, 1938 |
| 512,406 | Great Britain | Sept. 1, 1939 |